United States Patent
Wu et al.

(10) Patent No.: US 10,813,033 B1
(45) Date of Patent: Oct. 20, 2020

(54) PARTITIONED NETWORK ROUTING

(71) Applicant: Architecture Technology Corporation, Eden Prairie, MN (US)

(72) Inventors: John Wu, Eden Prairie, MN (US); Ranga S. Ramanujan, Medina, MN (US)

(*) Notice: Subject to any disclaimer, the term of this patent is extended or adjusted under 35 U.S.C. 154(b) by 261 days.

(21) Appl. No.: 15/945,933

(22) Filed: Apr. 5, 2018

(51) Int. Cl.
*H04W 40/26* (2009.01)
*H04W 40/24* (2009.01)
*B64C 39/02* (2006.01)
*H04W 84/18* (2009.01)

(52) U.S. Cl.
CPC ......... *H04W 40/26* (2013.01); *H04W 40/242* (2013.01); *H04W 40/248* (2013.01); *B64C 39/024* (2013.01); *H04W 84/18* (2013.01)

(58) Field of Classification Search
None
See application file for complete search history.

(56) References Cited

U.S. PATENT DOCUMENTS

| | | | |
|---|---|---|---|
| 7,107,498 B1* | 9/2006 | Schmidt | H04L 1/0026 714/704 |
| 2004/0076164 A1* | 4/2004 | Vanderveen | H04L 45/28 370/400 |
| 2004/0218548 A1* | 11/2004 | Kennedy | H04L 45/02 370/254 |
| 2006/0007865 A1* | 1/2006 | White | H04L 45/02 370/238 |
| 2006/0268737 A1* | 11/2006 | Lee | H04L 41/147 370/252 |
| 2010/0177674 A1* | 7/2010 | Aggarwal | H04L 45/50 370/312 |
| 2012/0155511 A1* | 6/2012 | Shaffer | H04B 1/713 375/133 |
| 2013/0088999 A1* | 4/2013 | Thubert | H04W 40/248 370/254 |
| 2013/0100942 A1* | 4/2013 | Rudnick | H04B 7/2656 370/337 |

(Continued)

OTHER PUBLICATIONS

"Schedule-Aware Bundle Routing", The Consultative Committee for Space Data Systems (CCSDS), pp. 1-33, Jul. 2017.

(Continued)

*Primary Examiner* — Ayaz R Sheikh
*Assistant Examiner* — Faiyazkhan Ghafoerkhan
(74) *Attorney, Agent, or Firm* — Carlson, Caspers, Vandenburgh & Lindquist, P.A.

(57) ABSTRACT

Embodiments for a routing module for a first node are disclosed. The routing module includes a computer readable medium having instructions thereon. The instructions cause one or more processing devices to track former links between the first node and a second node and determine a probability of a future link with the second node based on the former links. If the probability of a future link with a second node is above a threshold, an advertisement is sent to at least one other node indicating that the second node is reachable from the first node. If the probability of a future link with the second node is below the threshold and no other route exists from the first node to the second node, an advertisement is sent to at least one other node indicating that the second node is not reachable from the first node.

20 Claims, 7 Drawing Sheets

(56) References Cited

U.S. PATENT DOCUMENTS

| | | | | |
|---|---|---|---|---|
| 2014/0286377 A1* | 9/2014 | Shaffer | ............... | H04B 1/7156 |
| | | | | 375/135 |
| 2015/0055608 A1* | 2/2015 | Egner | ................... | H04W 4/025 |
| | | | | 370/329 |
| 2016/0020979 A1* | 1/2016 | Thubert | .............. | H04L 41/0803 |
| | | | | 370/252 |
| 2016/0073271 A1* | 3/2016 | Schultz | ............ | H04W 12/0804 |
| | | | | 455/404.1 |
| 2016/0249223 A1* | 8/2016 | Egner | ................... | H04W 40/20 |
| 2017/0079046 A1* | 3/2017 | Egner | ................ | H04W 64/006 |

OTHER PUBLICATIONS

Demmer, et al., "DTLSR: Delay Tolerant Routing for Developing Regions", NSDR '07, pp. 1-6, Aug. 27, 2007, Kyoto, Japan.

Lindgren, et al., "Probabilistic Routing Protocol for Intermittently Connected Networks", Internet Research Task Force (IRTF), pp. 1-113, Aug. 2012, USA.

* cited by examiner

PARTITIONED NETWORK ROUTING

BACKGROUND

Mobile ad hoc networks (MANETs) are becoming more common and being used in more situations. MANETs are a type of wireless ad hoc network that has a routable networking layer on top of a link layer ad hoc network. Thus, MANETs attempt to route messages through the network from a sender to a receiver. Existing MANET routing protocols include reactive protocols like the ad-hoc on-demand distance vector (AODV) protocol and the dynamic source routing (DSR) protocol, proactive protocols like the optimized link state routing protocol (OLSR) and the open shortest path first (OSPR) MANET protocol, and other hybrid schemes. Each of these protocols seek to establish an instantaneous route between a sender and a receiver, on the premise that the receive is always reachable somewhere in the network. In some MANET environments, however, nodes or portions of the network can be frequently partitioned from other nodes or portions of the network, resulting in a lack of instantaneous routes between given endpoints. The above MANET routing schemes may be unable to find a route through such a network from a sender to the receiver.

Delay Tolerant Networking (DTN) techniques are being developed to address the unique challenges of such frequently partitioned networks. The DTN routing protocols utilize a store and forward approach, where data is incrementally moved and stored through the network in an effort to get the data to the destination. One example DTN routing protocol is a flooding technique in which messages are replicated and forwarded to all nodes. Such flooding techniques, however, can be prohibitively expensive in resource-limited networks. Another DTN routing protocol is delay-tolerant link state routing (DTLSR). In DTLSR, links that are broken are not immediately removed from a routing graph. Instead, the broken links are aged out by increasing their metrics until some maximum is reached, at which point the links are removed from the graph. DTLSR operates on the hope that a recently broken link will be reestablished in the near future. Another DTN routing protocol is schedule-aware bundle routing (SABR). SABR uses a contact plan provided by network management which describes the current and future connectivity schedule of the nodes.

BRIEF DESCRIPTION

Embodiments for a routing module for a first node are disclosed. The routing module includes a computer readable medium having instructions thereon. The instructions, when executed by one or more processing devices, cause the one or more processing devices to track former links between the first node and a second node, and determine a probability of a future link with the second node based on the former links. If the probability of a future link with a second node is above a threshold, an advertisement is sent to at least one other node indicating that the second node is reachable from the first node. If the probability of a future link with the second node is below the threshold and no other route exists from the first node to the second node, an advertisement is sent to at least one other node indicating that the second node is not reachable from the first node.

Embodiments for a method for routing messages are also disclosed. The method includes tracking former links between the first node and a second node and determining a probability of a future link with the second node based on the former links. If the probability of a future link with a second node is above a threshold, an advertisement is sent to at least one other node indicating that the second node is reachable from the first node. If the probability of a future link with the second node is below the threshold and no other route exists from the first node to the second node, an advertisement is sent to at least one other node indicating that the second node is not reachable from the first node.

Embodiments for a first node including a routing module are also disclosed. The first node includes one or more processing devices and a computer readable medium coupled to the one or more processing devices. The computer readable medium includes instructions thereon, the instructions, when executed by the one or more processing devices, cause the one or more processing devices to track former links between the first node and a second node and determine a probability of a future link with the second node based on the former links. If the probability of a future link with a second node is above a threshold, an advertisement is sent to at least one other node indicating that the second node is reachable from the first node. If the probability of a future link with the second node is below the threshold and no other route exists from the first node to the second node, an advertisement is sent to at least one other node indicating that the second node is not reachable from the first node.

DRAWINGS

Understanding that the drawings depict only exemplary embodiments and are not therefore to be considered limiting in scope, the exemplary embodiments will be described with additional specificity and detail through the use of the accompanying drawings, in which.

DETAILED DESCRIPTION

Figure 1:
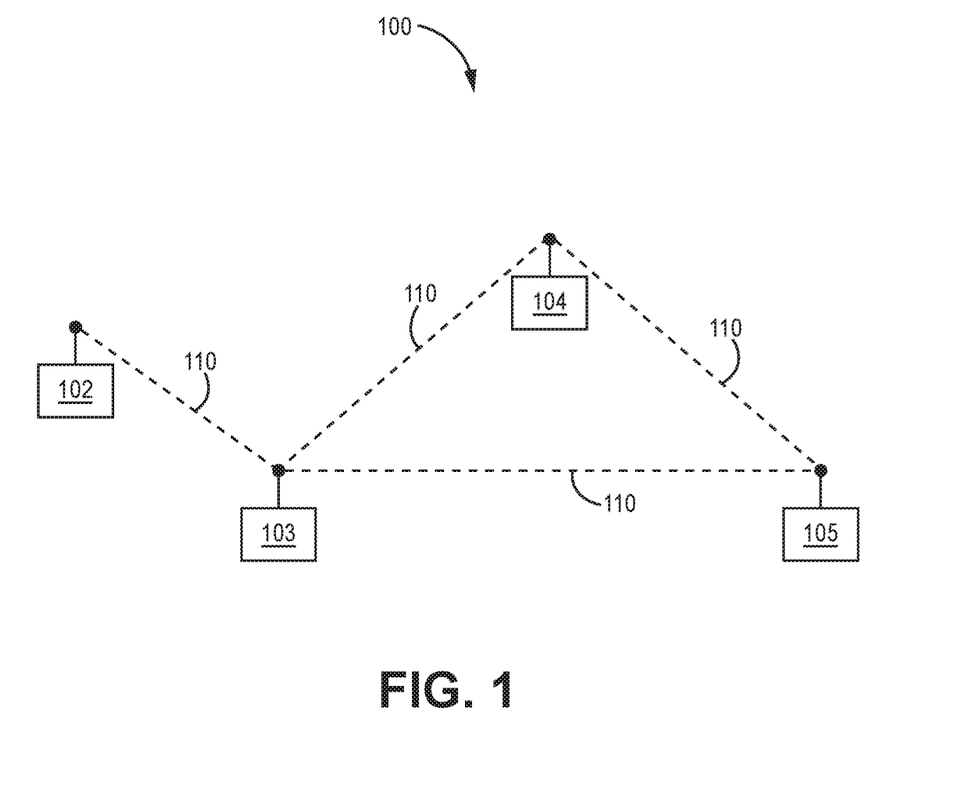
FIG. 1 is a block diagram of an example network including a plurality of wireless nodes implementing a routing protocol for frequently partitioned networks.

FIG. 1 is a block diagram of an example network 100 including a plurality of wireless nodes 102-105. Each node 102-105 can wirelessly communicate with other nodes 102-105 that are within wireless signal range and are actively communicating. Nodes 102-105 establish wireless links 110 with other nodes that are within range and can send and receive messages to such other nodes 102-105 over the wireless links 110. The nodes 102-105 can organize into a MANET to route messages across the network 100 over multi-hop routes. As used herein a "wireless link" or simply a "link" is a point-to-point wireless connection between two nodes 102-105, with no other node in between the two nodes. Accordingly, a link is a direct wireless connection between two nodes 102-105.

The nodes 102-105 can be any device capable of joining a MANET. Example nodes 102-105 include, a mobile phone, wearable device, smart home device, robot, or unmanned vehicle. Example unmanned vehicles include an unmanned aerial vehicle (UAV), an unmanned land vehicle, or an unmanned water vehicle.

Figure 2A:
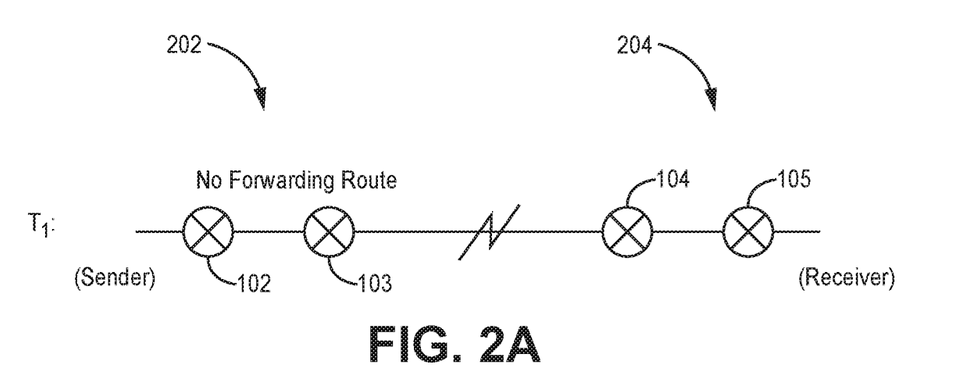
FIGS. 2A-2C are example positions of the wireless nodes of FIG. 1, illustrating a time lapse over which the wireless nodes can route a message across a partitioned network using the routing protocol described herein.
Figure 2B:
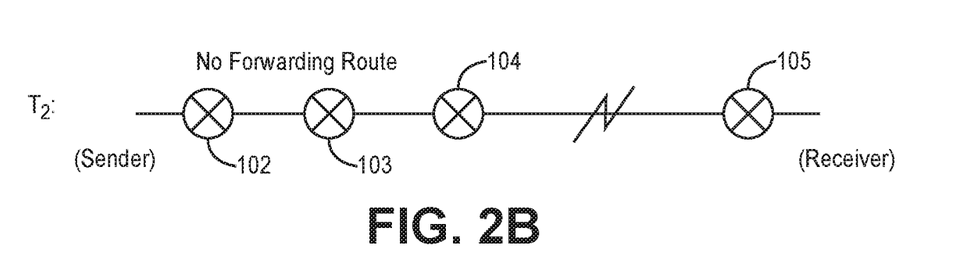
Figure 2C:
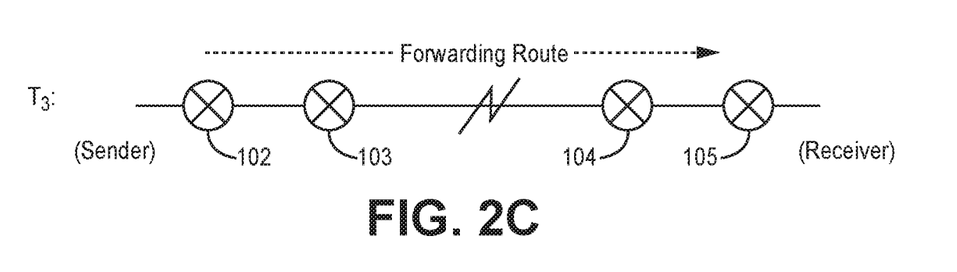

FIGS. 2A-2C illustrate example relative positions of the nodes 102-105 in network 100 during three different times. FIG. 2A is a block diagram of the network 100 illustrating an example position of the nodes 102-105 at time=1. At time=1 the network 100 is split into two partitions 202, 204 by the relative positions of the nodes 102-105. The first partition 202 includes node 102 and node 103, which are communicatively coupled together via a first link 110. The second partition 204 includes node 104 and node 105, which are communicatively coupled together via a second link 110. In this example situation, neither node 102 nor node 103 are within range of either node 104 or node 105, which causes the network 100 to be split into the two partitions 202, 204.

The routing module in each node 102-105 implements a routing protocol in which instantaneous and asynchronous routes are considered. Instantaneous routes are routes in which all the links of the route from the origination of the message to the destination of the message are UP (i.e., established) at the same time. Asynchronous routes, in contrast, are routes in which one or more of the links of the route from the origination of the message to the destination of the message are down (i.e., no link exists) at the present time. For instantaneous routes, a message can be immediately forwarded from each node on the route, because the forward link from each node is UP. For asynchronous routes, a message must be stored at any node in which the forward link is down until that forward link is established.

The routing protocol used by the routing modules discovers both instantaneous and asynchronous routes between the nodes 102-105. Routes are discovered by receiving advertisements from neighboring nodes 102-105. As used herein, a "neighboring node" to a first node is a node having a link that is UP with the first node at the present time. Each node 102-105 sends an advertisement to neighboring nodes 102-105 that advertises other nodes 102-105 that are reachable from that node 102-105. The advertisements indicate nodes 102-105 that are reachable via one or more current links (i.e., UP links, instantaneous routes) as well as nodes 102-105 that are reachable via one or more future links (i.e., asynchronous routes).

Figure 3:
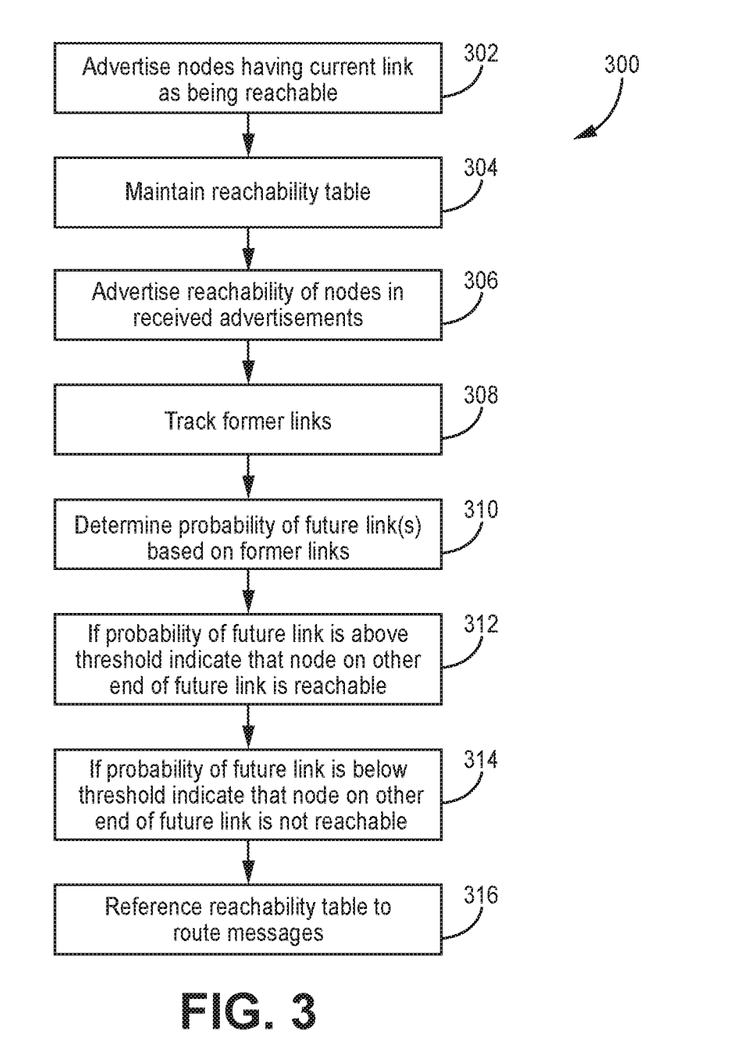
FIG. 3 is a flow diagram of an example method for routing a message in a frequently partitioned network in the routing protocol described herein.

FIG. 3 is a flow diagram of an example method 300 for routing a message in a frequently partitioned network. As mentioned above, nodes 102-105 in the network send out advertisements indicating reachability of other nodes from that node. Each node 102-105 determines which other nodes 102-105 to indicate in its advertisements as reachable. In an example, a node 103-105 that has a current link with a first node 102 is indicated in an advertisement from the first node 102 as being reachable (block 302). In the example situation of FIG. 2A, the first node 102, having a current link with the second node 103, can indicate that the second node 103 is reachable therefrom. The second node 103 can likewise indicate that the first node 102 is reachable therefrom. Similarly, the third node 104 can indicate that the fourth node 105 is reachable therefrom and the fourth node 105 can indicate that the third node 104 is reachable therefrom. The advertisements including these reachability indications would be passed to neighboring nodes 102-105 so that each node 102-105 can learn the reachability of other nodes 102-105 via their neighboring nodes 102-105.

Each node can maintain a reachability table (e.g., routing table/graph) that keeps track of the reachability of other nodes from that node (block 304). Maintaining a reachability table can include updating the reachability table to reflect the reachability of nodes indicated in received advertisements. In response to receiving an advertisement from a neighboring node, a node can update reachability indications in its reachability table if necessary. The nodes 102-105 can also update the reachability indications in their advertisements to reflect the reachability of nodes indicated in received advertisements (block 306). That is, any node that is reachable from a neighboring node to a first node 102 is also reachable from that first node 102 by virtue of its link with the neighboring node, and the advertisements sent by that first node 102 can indicate such reachability.

In the example situation of FIG. 2A, no additional nodes are shown with a link to the second node 103, but if there were any additional nodes linked to the second node 103, the second node 103 would indicate in its advertisement that those nodes are reachable from the second node 103. The first node 102, in response to receiving such an advertisement from the second node 103 would update its reachability indications in its advertisement to indicate that such additional nodes are reachable from the first node 102. Each node updates it reachability indications based on received advertisements in this way, such that reachability of all nodes 102-105 propagates through the network via the advertisements. The advertisements can be sent repeatedly (e.g., periodically) to achieve propagation of the reachability indications through the network 100. The nodes 102-105 can maintain their reachability table based on advertisements from other nodes and reference the table to determine which nodes to indicate as reachable in their own advertisements. Nodes can also update their reachability table to indicate that a node is no longer reachable therefrom. Thus, nodes can be removed from the reachability table as well. The reachability table can also include other information, such as the forwarding node for each reachable node. The forwarding node for a reachable node is the neighboring node to the node maintaining the reachability table via which the reachable node is reachable. Thus, any additional nodes reachable from the second node 103 would be indicated in the reachability table of the first node 102, as having a forwarding node of the second node 103.

Each node 102-105 can also indicate reachability of another node via one or more future links. A future link is a link that does not currently exist, but which a node 102-105 predicts will exist in the future. Nodes 102-105 can determine the probability of a future link being established with another node 102-105 based on former links with that other node 102-105. Each node 102-105 can track its former links for use in determining such a probability of a future link.

FIG. 2B is a block diagram of example positions of the nodes 102-105 of the network 100 at time=2. At time=2 the third node 104 has moved relative to the other nodes 102, 103, 105 and no longer has a link to the fourth node 105. The new position of the third node 104, however, enables the third node 104 to establish a link with the second node 103. During the transition between time=1 and time=2, the nodes 102-105 continue to send advertisements indicating reachability therefrom and update their own reachability tables based thereon. Accordingly, some time after a link is established between the second node 103 and the third node 104, the reachability tables of the first node 102, second node 103, and third node 104 are updated to reflect reachability to the others of the first node 102, second node 103, and third node 104 respectively.

Additionally, the third node 104 can indicate in its advertisement, reachability to the fourth node 104 via a future link. Before indicating reachability via a future link, a node determines a probability of a future link with another node (block 310). The probability can be based on one or more factors, including former links with the other node. If the probability of the future link is above a threshold, the node indicates in its reachability table (and corresponding in its advertisement) that the other node is reachable therefrom (block 312). If the probability of the future link is below the threshold, and the other node is not reachable via any neighboring nodes, the node indicates in its reachability table that the other node is not reachable therefrom (block 314). The node can indicate that the other node is not reachable by including a positive indication that the other node is not reachable or can indicate that the other node is not reachable by removing the other node from the reachability table.

In the situation of FIG. 2B, we'll assume that the third node 104 determines that the probability of a future link with the fourth node 105 is above the threshold. In such a situation, the third node 104 indicates that the fourth node 105 is reachable therefrom in its advertisements. This reachability is propagated from the third node 104 to the second node 103 and on to the first node 102 via the repeated advertisements. If the first node 102 obtains a message having a destination of the fourth node 105 at time=2, the first node 102 references its reachability table to identify a route to the fourth node 105 via a route through the second node 103. Accordingly, the first node 102 sends the message to the second node 103. The second node 103 can reference its reachability table to identify that the forwarding node for a message destined for the fourth node 105 is the third node 103. Accordingly, the second node 103 can send the message to the third node 104. In response to receiving the message destined for the fourth node 105, the third node 104 can identify that a route to the fourth node 104 is not available via any current links. The third node 104 can also identify that a route to the fourth node 104 is available via a future link (having a probability above the threshold as discussed above). Since no current link is available, but a future link is available, the third node 104 can hold the message until the future link is up.

The probability of a future link between two nodes can be determined based on former links established between the two nodes (block 310). Each node 102-105 can keep track of former links (i.e., links that were established, but are presently down) with other nodes to determine the probability of a future link (block 308). For example, if a link has never been established between two nodes 102-105, those nodes 102-105 can set the probability of a future link therebetween as zero, or another low number. If, however, many links have been established between two nodes 102-105, those nodes 102-105 can set the probability of a future link therebetween higher. The nodes 102-105 can also keep track of other information regarding the former links and use that information when determining the probability of a future link. The other information can include a bandwidth of a former link and/or one or more time metrics of a former link. The one or more time metrics can include when a former link was established, broken, or a time during which the former link was UP, and/or a duration of a former link.

The nodes 102-105 can analyze this other information to identify patterns in timing of the former links. Any patterns identified can be used to determine a probability of a future link and to predict a time of a future link. For example, if a timing of the former links indicates a periodic link establishment between nodes and the most recent former link between the two nodes occurred within the duration of a period from the present time, the two nodes can determine that the probability of the future link is high—because a future link is likely to be established at the next period mark. Using FIGS. 2A-2C as an example, if the former links between the third node 104 and the fourth node 105 indicate that a link is established between the third node 104 and the fourth node 105 every two hours, and the most recent former link between the two nodes 104, 105 was broken moments ago, the third node 104 and the fourth node 105 can each determine that the probability of a future link between the two nodes 104, 106 is high. If, however, the most recent former link between the two nodes occurred long past the duration of a period from the present time (e.g., longer than two, three, four, or five period durations), the two nodes can determine that that periodic establishment of links has likely ended and reduce the probability of a future link therebetween accordingly. In an example, other information in addition to former links and information on the former links can be used to determine the probability of a future link, such as a known future location or sleep/wake timing of one or more nodes.

FIG. 2C is a block diagram of example positions of the nodes 102-105 of the network 100 at time=3. At time=3 the third node 104 has moved again relative to the first node 102, second node 103, and fourth node 105 to now have a link again with the fourth node 105, but no longer have a link with second node 103. In response to establishing the link with the fourth node 105, the third node 104 sends the message to the fourth node 105, thereby completing the route for the message.

In the situations of FIGS. 2A-2C, no instantaneous route ever exists between the first node 102 and the fourth node 105. However, the routing protocol is able to efficiently discover a route and route a message from the first node 102 to the fourth node 105 by discovering an asynchronous route therebetween. Each node 102-105 determines the likelihood of future links with other nodes and updates their reachability tables and advertisements to reflect the future links. Thus, reachability information on nodes available via asynchronous routes propagates through the network 100 along with the reachability information for instantaneous routes. This allows the nodes 102-105 to discover asynchronous routes in an efficient manner.

Advantageously, by determining the probability of future links at each node and only advertising reachability of a node via future link if that future link is above a threshold, the pruning of asynchronous routes that are unlikely to occur is spread across the nodes 102-105. Additionally, because each node determines a probability of future links based on former links to which that node was a part, each node can independently identify and track information regarding the corresponding former links, which reduces information that needs to be passed throughout the network. Moreover, by each node independently pruning links before advertising reachability over such links, asynchronous route including future links that are unlikely to occur are not propagated through the network, further reducing the amount of information that needs to be transmitted to implement the routing protocol. Accordingly, the routing protocol described herein provides an efficient way to discover and prune asynchronous routes in a MANET.

In an example, other information can be included in the advertisements and tracked in the reachability tables along with the reachability information. For example, each node 102-105 can indicate in its advertisements whether a node reachable therefrom is reachable via an instantaneous route or via an asynchronous route. Each node can also store an indication in its reachability table of whether a node that is reachable therefrom is reachable via an instantaneous route or an asynchronous route. Other information that can be included in the advertisements and tracked in the reachability table can include a number of hops to a node and a duration of a path to the node.

The routing protocol implemented by the nodes 102-105 can reference the information in the reachability table to select a route for a message and forward a message to an appropriate forwarding node for that route (block 316). In situations when there are multiple available routes to a destination, the nodes 102-105 can reference the information in the reachability table and determine which route to use based on the information for each of the multiple available routes. In an example, the routing protocol can prefer instantaneous routes over asynchronous routes, such that in a situation where one or more instantaneous routes and one or more asynchronous routes are available to a destination, a node will select an instantaneous route instead of any of the asynchronous routes.

Advantageously, by discovering and considering both instantaneous and asynchronous routes together, the route protocol described herein provides the benefits of both types of routes. Instantaneous routes are discovered and can be chosen if available, while asynchronous routes are also discovered and can be utilized if an asynchronous route is not available. Moreover, by having each node determine a probability of a future link and then advertising the future link, if the probability is sufficiently high, the routing protocol efficiently weeds out low probability routes, while still discovering the high probability ones.

Each node 102-105 includes a routing module which implements the routing protocol described herein. Each routing module can be a software-tool that is loaded onto the node or can be a hardware appliance with appropriate software that is installed in the node. The routing module can provide other functions in addition to the routing module described herein. In an example, the routing module is a communication enhancement module described in co-pending U.S. patent application Ser. No. 15/916,000, titled "UAV COMMUNICATION ENHANCEMENT MODULE", or co-pending U.S. Patent Application No. 15/926,978, titled "PRE-PLACED MESSAGES", both of which are hereby incorporated herein by reference.

Figure 4:
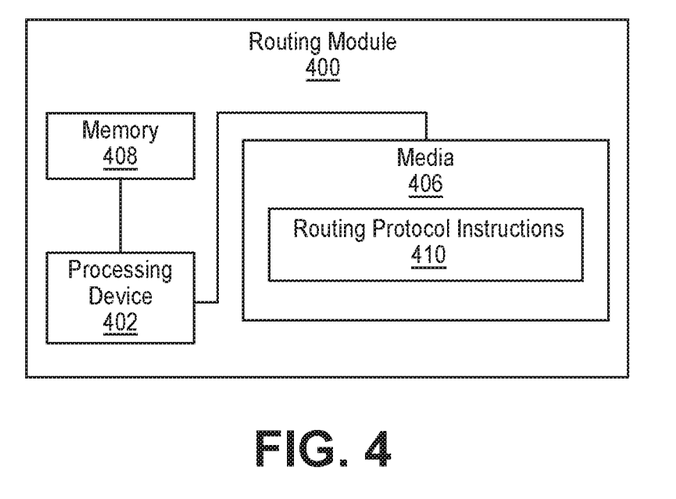
FIG. 4 is an example hardware appliance routing protocol for implementing the routing protocol described herein.

FIG. 4 is a block diagram of an example hardware appliance routing module 400. The hardware appliance routing module 400 includes one or more processing devices 402 for executing routing protocol instructions 410. The one or more processing devices 402 can include a general-purpose processor or a special purpose processor. The routing protocol instructions 410 are stored (or otherwise embodied) on or in an appropriate storage medium or media 406 (such as flash or other non-volatile memory) from which the instructions 410 are readable by the processing device(s) 402 for execution thereby. The routing module 400 also includes memory 408 that is coupled to the processing device(s) 402 for storing instructions (and related data) during execution by the processing device(s) 402. Memory 408 comprises, in one implementation, any suitable form of random access memory (RAM) now known or later developed, such as dynamic random-access memory (DRAM). In other implementations, other types of memory are used. The routing protocol instructions 410, when executed by the one or more processing devices 402, cause the one or more processing devices 402 to perform the actions of the routing module 400 described herein.

Figure 5:
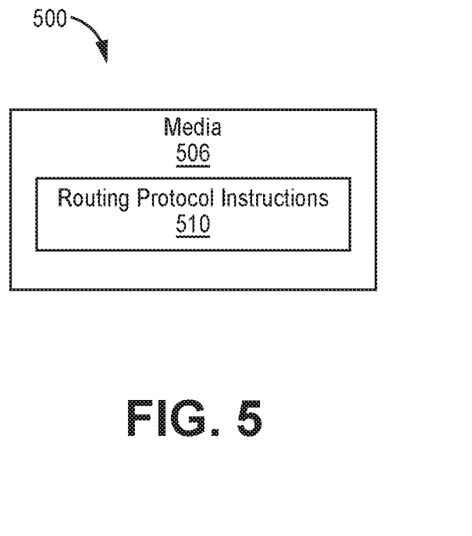
FIG. 5 is an example software product routing module for implementing the routing protocol described herein.

FIG. 5 is a block diagram of an example software product routing module 500. The software product routing module 500 includes routing protocol instructions 510 that are stored or otherwise embodied on a computer readable medium 506 that is distinct from any processing devices, memory, and other associated hardware. Such routing protocol instructions 510 can be loaded onto an appropriate hardware device, such as the hardware device shown in FIG. 4 or the hardware device shown in FIG. 6, such that that hardware device implements the routing module described herein. The computer readable media on which the routing protocol instructions 510 are stored can be any suitable computer readable media such as a magnetic media such as a hard disk drive (HDD), optical media such as a CD, DVD, Blu-Ray disk, or a non-volatile electric media such as a solid-state drive (SDD), flash media, or EEPROM. Such computer readable media can be standalone media (e.g., a USB stick or CD) or can be computer readable media within a computing device (e.g., a server or network accessible storage).

Figure 6:
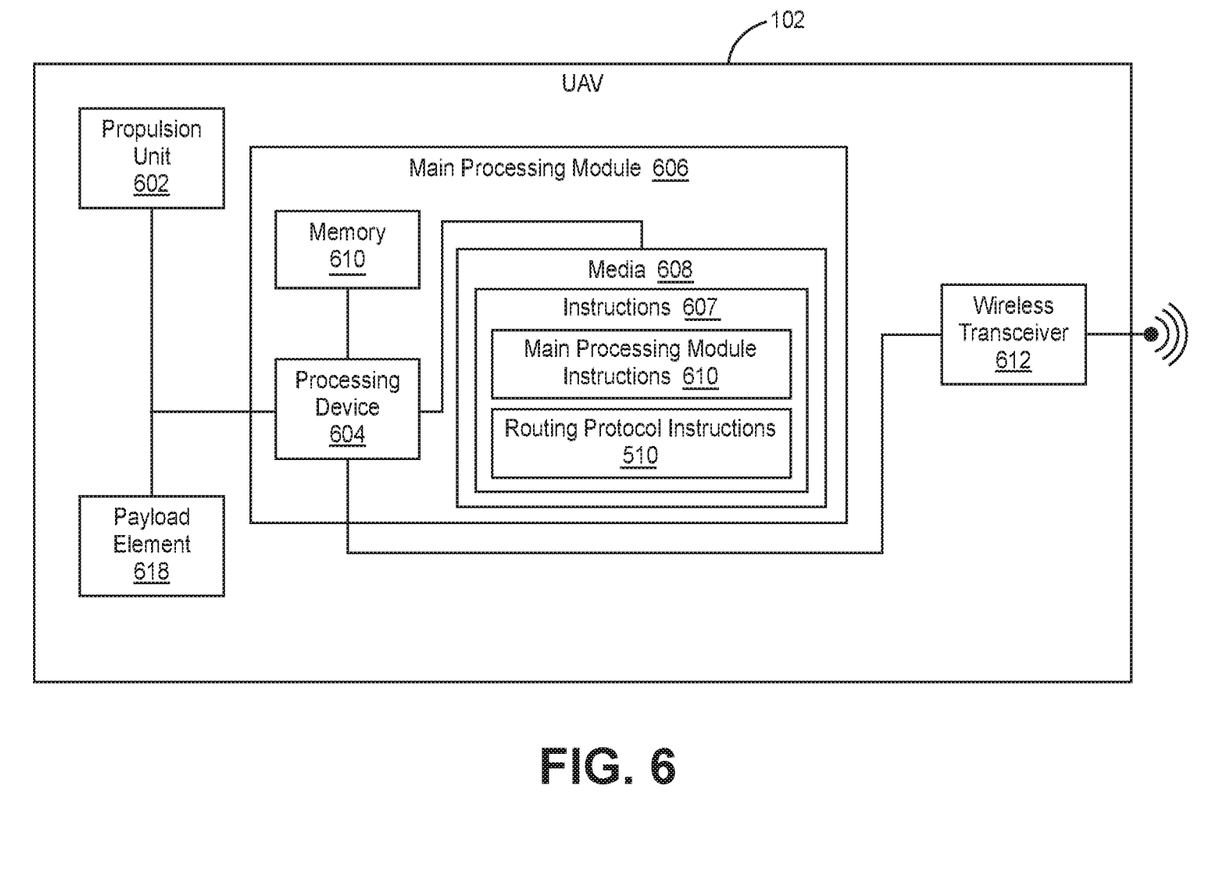
FIG. 6 is an example node of FIGS. 1 and 2 including routing protocol instructions for implementing the routing protocol described herein.

FIG. 6 is a block diagram of an example node 102 that includes routing protocol instructions 510 loaded thereon. In this example, the node 102 is an unmanned aerial vehicle (UAV), which includes a propulsion unit 602 to propel the UAV. Any appropriate propulsion unit 602 can be used including one or more electric motors or fuel engines and propellers, jet engines, and/or ducted fan.

The UAV also includes a main processing module 606 that performs the general processing for the UAV. The main processing module 606 includes one or more processing devices 604 for executing instructions 607. The one or more processing devices 604 can include a general-purpose processor or a special purpose processor. The instructions 607 are stored (or otherwise embodied) on or in an appropriate storage medium or media 608 (such as flash or other non-volatile memory) from which the instructions 607 are readable by the processing device(s) 604 for execution thereby. The main processing module 606 also includes memory 609 that is coupled to the processing device(s) 604 for storing instructions (and related data) during execution by the processing device(s) 604. Memory 609 comprises, in one implementation, any suitable form of random access memory (RAM) now known or later developed, such as dynamic random-access memory (DRAM). In other implementations, other types of memory are used.

The instructions 607 include the routing protocol instructions 510. The routing protocol instructions 510, when executed by the one or more processing devices 604, cause the node 102 to perform the actions of the routing module described herein. The instructions 607 can also include the other instructions 610 which, when executed by the one or more processing devices 604, cause the node 102 to perform other actions as desired.

The main processing module 606 is coupled to the propulsion unit 602 to provide commands thereto and receive information from sensors thereof. The main processing module 606 is also coupled to a wireless transceiver 612 for transmitting and receiving wireless signals with other nodes 103-105 as described herein. The UAV can also include one or more payload elements 618 coupled to the main processing module 606 as described herein.

Figure 7:
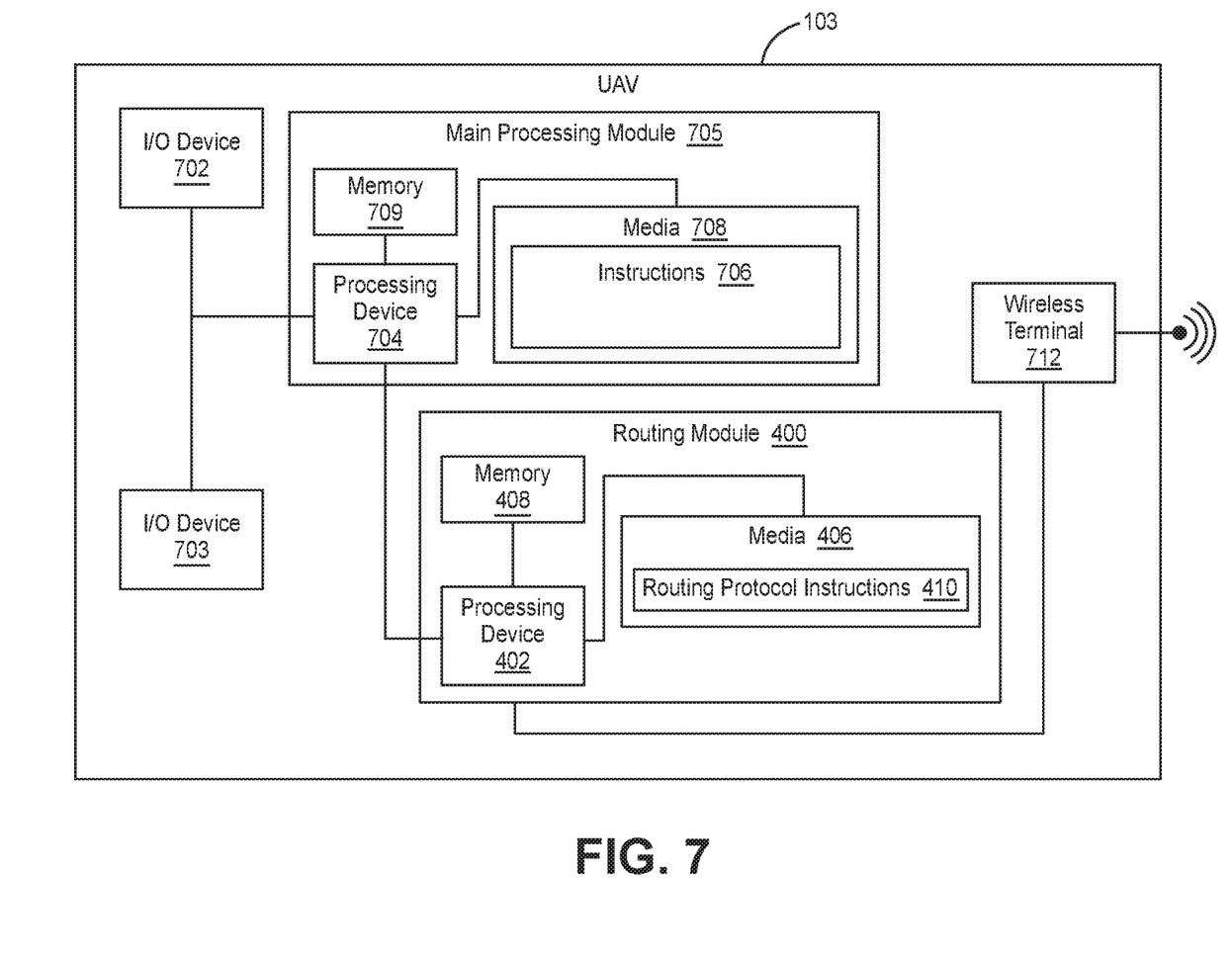
FIG. 7 is an example node of FIGS. 1 and 2 including a hardware appliance routing module for implementing the routing protocol described herein.

FIG. 7 is a block diagram of an example node 103 that includes a hardware appliance routing module 400 installed therein. The node 103 can include one or more input/output (I/O) devices 702, 703 for receiving input from, or providing input to, a user. The I/O device(s) 702, 703 can include any suitable I/O device such as a keyboard, display screen, touchscreen, mouse, touchpad, microphone, etc. The node 103 also includes a main processing module 705 that performs the general processing for the node 103. The main processing module 705 includes one or more processing devices 704 for executing instructions 706. The one or more processing devices 704 can include a general-purpose processor or a special purpose processor. The instructions 706 are stored (or otherwise embodied) on or in an appropriate storage medium or media 708 (such as flash or other non-volatile memory) from which the instructions 706 are readable by the processing device(s) 704 for execution thereby. The instructions 706, when executed by the one or more processing devices 704, cause the one or more processing devices 704 to perform the desired actions of the node 103. The main processing module 705 also includes memory 709 that is coupled to the processing device(s) 704 for storing instructions (and related data) during execution by the processing device(s) 704. Memory 709 comprises, in one implementation, any suitable form of random access memory (RAM) now known or later developed, such as dynamic random-access memory (DRAM). In other implementations, other types of memory are used.

The main processing module 705 is coupled to the I/O devices 702, 703 to receive input therefrom and provide output thereto. The main processing module 705 is also coupled to the routing module 400, which is an appliance installed in the node 103. The routing module 400 includes the hardware and software components described in FIG. 4, which are distinct from the hardware and software components of the main processing module 208. The routing module 400 is coupled to a wireless transceiver 712 for transmitting and receiving wireless signals with other nodes 103 as described herein.

Although the example node 102 and node 103 shown in FIGS. 6 and 7 include a software tool and a hardware-with-software appliance respectively, these are merely examples. The routing module for a node 102-105 can be either a software tool or a hardware with software appliance.

What is claimed is:

1. A routing module for a first node, the routing module comprising:
 a non-transitory computer readable medium having instructions thereon, the instructions, when executed by one or more processing devices, cause the one or more processing devices to:
  track former links between the first node and a second node;
  determine a probability of a future link with the second node based on the former links;
  in response to determining that the probability of a future link with a second node is above a threshold while no link exists between the first node and the second node, send an advertisement to at least one other node indicating that the second node is reachable from the first node; and
  in response to determining that the probability of a future link with the second node is below the threshold while no route exists from the first node to the second node, send an advertisement to at least one other node indicating that the second node is not reachable from the first node.

2. The routing module of claim 1, wherein track former links includes track a time metric related to the former links, wherein determine the probability of a future link includes determine the probability based on the time metric.

3. The routing module of claim 2, wherein determine the probability includes:
 determine whether the time metrics of the former links indicate periodic link establishment between the first node and the second node; and
 increase the probability of a future link in response to determining periodic link establishment occurs and a most recent former link occurred within a duration of a period of the periodic link establishment from the present time.

4. The routing module of claim 3, wherein determine the probability includes:
 decrease the probability of a future link if a periodic link establishment is determined and a most recent former link occurred longer than a duration of two periods of the periodic link establishment from the present time.

5. The routing module of claim 3, wherein the instructions cause the one or more processing devices to:
 determine when a future link between the first node and the second node is predicted to occur based on the periodic link establishment; and
 in response to determining that the probability of a future link between the first node and the second node is above the threshold, include the predicted time of the future link in the advertisement indicating reachability of the second node.

6. The routing module of claim 1, wherein the instructions cause the one or more processing devices to:
 obtain a message having a destination of a third node;
 in response to determining that one or more instantaneous routes to the third node exist, send the message over at least one of the one or more instantaneous routes without sending the message over any asynchronous routes to the third node; and
 in response to determining that no instantaneous routes exist and one or more asynchronous routes to third node exist, send the message over at least one of the asynchronous routes to the third node.

7. A method for routing messages, the method comprising:
 tracking former links between the first node and a second node;
 determining a probability of a future link with the second node based on the former links;
 in response to determining that the probability of a future link with a second node is above a threshold while no link exists between the first node and the second node, sending an advertisement to at least one other node indicating that the second node is reachable from the first node; and
 in response to determining that the probability of a future link with the second node is below the threshold while no route exists from the first node to the second node, sending an advertisement to at least one other node indicating that the second node is not reachable from the first node.

8. The method of claim 7, wherein tracking former links includes tracking a time metric related to the former links, wherein determining the probability of a future link includes determining the probability based on the time metric.

9. The method of claim 8, wherein determining the probability includes:

determining whether the time metrics of the former links indicate periodic link establishment between the first node and the second node; and increasing the probability of a future link in response to determining periodic link establishment occurs and a most recent former link occurred within a duration of a period of the periodic link establishment from the present time.

10. The method of claim 9, wherein determining the probability includes:

decreasing the probability of a future link if a periodic link establishment is determined and a most recent former link occurred longer than a duration of two periods of the periodic link establishment from the present time.

11. The method of claim 9, comprising:

determining when a future link between the first node and the second node is predicted to occur based on the periodic link establishment; and in response to determining that the probability of a future link between the first node and the second node is above the threshold, including the predicted time of the future link in the advertisement indicating reachability of the second node.

12. The method of claim 7, comprising:

obtaining a message having a destination of a third node;

in response to determining that one or more instantaneous routes to the third node exist, sending the message over at least one of the one or more instantaneous routes without sending the message over any asynchronous routes to the third node; and in response to determining that no instantaneous routes exist and one or more asynchronous routes to third node exist, sending the message over at least one of the asynchronous routes to the third node.

13. A first node including a routing module, the first node comprising:

one or more processing devices; and a non-transitory computer readable medium coupled to the one or more processing devices, the computer readable medium having instructions thereon, the instructions, when executed by the one or more processing devices, cause the one or more processing devices to:

track former links between the first node and a second node;

determine a probability of a future link with the second node based on the former links;

in response to determining that the probability of a future link with a second node is above a threshold while no link exists between the first node and the second node, send an advertisement to at least one other node indicating that the second node is reachable from the first node; and in response to determining that the probability of a future link with the second node is below the threshold while no route exists from the first node to the second node, send an advertisement to at least one other node indicating that the second node is not reachable from the first node.

14. The first node of claim 13, wherein track former links includes track a time metric related to the former links, wherein determine the probability of a future link includes determine the probability based on the time metric.

15. The first node of claim 14, wherein determine the probability includes:

determine whether the time metrics of the former links indicate periodic link establishment between the first node and the second node; and increase the probability of a future link in response to determining that periodic link establishment occurs and a most recent former link occurred within a duration of a period of the periodic link establishment from the present time.

16. The first node of claim 15, wherein determine the probability includes:

decrease the probability of a future link in response to determining that periodic link establishment occur and a most recent former link occurred longer than a duration of two periods of the periodic link establishment from the present time.

17. The first node of claim 15, wherein the instructions cause the one or more processing devices to:

determine when a future link between the first node and the second node is predicted to occur based on the periodic link establishment; and in response to determining that the probability of a future link between the first node and the second node is above the threshold, include the predicted time of the future link in the advertisement indicating reachability of the second node.

18. The first node of claim 13, wherein the instructions cause the one or more processing devices to:

obtain a message having a destination of a third node;

in response to determining that one or more instantaneous routes to the third node exist, send the message over at least one of the one or more instantaneous routes without sending the message over any asynchronous routes to the third node; and in response to determining that no instantaneous routes exist and one or more asynchronous routes to third node exist, send the message over at least one of the asynchronous routes to the third node.

19. The first node of claim 13, comprising:

a propulsion system to propel the first node in flight.

20. The first node of claim 13, comprising:

one or more input/output devices to interact with a user.

* * * * *